(12) United States Patent
Terada

(10) Patent No.: US 8,216,037 B2
(45) Date of Patent: Jul. 10, 2012

(54) GAME DEVICE, GAME DEVICE CONTROL METHOD, AND INFORMATION STORAGE MEDIUM

(75) Inventor: Toshiyuki Terada, Chiba (JP)

(73) Assignee: Konami Digital Entertainment Co., Ltd., Tokyo (JP)

( * ) Notice: Subject to any disclaimer, the term of this patent is extended or adjusted under 35 U.S.C. 154(b) by 388 days.

(21) Appl. No.: 12/479,422

(22) Filed: Jun. 5, 2009

(65) Prior Publication Data

US 2009/0305757 A1 Dec. 10, 2009

(30) Foreign Application Priority Data

Jun. 9, 2008 (JP) ................................ 2008-150152

(51) Int. Cl.
*A63F 9/24* (2006.01)
(52) U.S. Cl. .................... 463/4; 463/7; 463/31; 463/37; 463/40; 463/42
(58) Field of Classification Search ........................ None
See application file for complete search history.

(56) References Cited

U.S. PATENT DOCUMENTS 7,993,200 B2 * 8/2011 Suzuki et al. .................. 463/34
2009/0054143 A1 * 2/2009 Suzuki et al. .................. 463/34
2009/0305757 A1 * 12/2009 Terada .............................. 463/4

FOREIGN PATENT DOCUMENTS

JP 2006271692 A * 10/2006
JP 2008-054760 A 3/2008
WO WO 2006103818 A1 * 10/2006

* cited by examiner

*Primary Examiner* — David E Graybill
(74) *Attorney, Agent, or Firm* — Sughrue Mion, PLLC

(57) ABSTRACT

A game device executes a sport game. When a second team keeps the moving object, a first control unit controls the position of a player character belonging to a first team, based on both of either the position of a player character keeping the moving object or the position of the moving object, and the position of a predetermined area correlated to a first team, and a second control unit controls the position of the player character belonging to the first team, based on only one of either the position of the player character keeping the moving object or the position of the moving object, and the position of the predetermined area. In the case where a predetermined condition is satisfied, a control switching unit causes the second control unit to carry out the above-described control, instead of the first control unit.

6 Claims, 8 Drawing Sheets

GAME DEVICE, GAME DEVICE CONTROL METHOD, AND INFORMATION STORAGE MEDIUM

CROSS-REFERENCE TO RELATED APPLICATION

The present application claims priority from Japanese application JP2008-150152 filed on Jun. 9, 2008, the content of which is hereby incorporated by reference into this application.

BACKGROUND OF THE INVENTION

1. Field of the Invention

The present invention relates to a game device, a game device control method, and an information storage medium.

2. Description of the Related Art

There is known a sport game to be carried out between two teams in which, in the case where a moving object (e.g., a ball, a puck, and so forth) has moved into a predetermined area correlated to one of the two teams, a score event occurs for the other team. For example, a soccer game, a basket ball game, a rugby football game, an American football game, an ice hockey game, and the like are known (e.g., disclosed in JP2008-54760A).

SUMMARY OF THE INVENTION

In a sport game, a scoring scene is the most exciting scene. Therefore, a match with no score made by either team may lack excitement. For example, in the case where no score is made by either teams in a match in a soccer game event, the event itself may not become as exciting as expected. In such a case, it is desirable to have an arrangement making it easy to score in a sport game. However, if it is always the case that a score can be easily made, excitement of the sport game may be deteriorated. In view of the above, it is necessary to effect an arrangement for making a score easily only in a predetermined case.

The present invention has been conceived in view of the above, and aims to provide a game device, a game device control method, and an information storage medium, in which, e.g., in a sport game in which a score event occurs with respect to one team in the case where a moving object has moved into a predetermined area correlated to the other team, an arrangement for making a score relatively easily is effected only in a predetermined case.

In order to achieve the above described objects, according to one aspect of the present invention, there is provided a game device for carrying out a sport game played between a first team and a second team, in which a score event occurs for the second team in the case where a moving object has moved into a predetermined area, comprising a first control unit for, when a player character belonging to the second team keeps the moving object, controlling a position of a player character belonging to the first team, based on both of either a position of the player character keeping the moving object or a position of the moving object, and a position of the predetermined area; a second control unit for, when the player character belonging to the second team keeps the moving object, controlling the position of the player character belonging to the first team, based on only one of either the position of the player character keeping the moving object or the position of the moving object, and the position of the predetermined area; and a determination unit for determining whether or not a predetermined condition is satisfied; a control switching unit, in the case where it is determined that the predetermined condition is satisfied, for causing the second control unit, instead of the first control unit, to control the position of the player character belonging to the first team when the player character belonging to the second team keeps the moving object.

According to another aspect of the present invention, there is provided a method for controlling a game device for carrying out a sport game played between a first team and a second team, in which a score event occurs for the second team in the case where a moving object has moved into a predetermined area, comprising a first control step of, when a player character belonging to the second team keeps the moving object, controlling a position of a player character belonging to the first team, based on both of either a position of the player character keeping the moving object or a position of the moving object, and a position of the predetermined area; a second control step of, when the player character belonging to the second team keeps the moving object, controlling the position of the player character belonging to the first team, based on only one of either the position of the player character keeping the moving object or the position of the moving object, and the position of the predetermined area; and a determination step of determining whether or not a predetermined condition is satisfied; a control switching step of, in the case where it is determined that the predetermined condition is satisfied, controlling at the second control step, instead of the first control step, the position of the player character belonging to the first team when the player character belonging to the second team keeps the moving object.

According to another aspect of the present invention, there is provided a program for causing a computer to function as a game device for carrying out a sport game played between a first team and a second team, in which a score event occurs for the second team in the case where a moving object has moved into a predetermined area, comprising a first control unit for, when a player character belonging to the second team keeps the moving object, controlling a position of a player character belonging to the first team, based on both of either a position of the player character keeping the moving object or a position of the moving object, and a position of the predetermined area; a second control unit for, when the player character belonging to the second team keeps the moving object, controlling the position of the player character belonging to the first team, based on only one of either the position of the player character keeping the moving object or the position of the moving object, and the position of the predetermined area; and a determination unit for determining whether or not a predetermined condition is satisfied; a control switching unit for, in the case where it is determined that the predetermined condition is satisfied, causing the second control unit, instead of the first control unit, to control the position of the player character belonging to the first team when the player character belonging to the second team keeps the moving object.

An information storage medium according to the present invention is a computer readable information storage medium recoding the above described program.

According to the present invention, in a sport game in which, for example, in the case where a moving object has moved into a predetermined area correlated to one of the teams, a score event occurs with respect to the other team, an arrangement for making a score relatively easily can be effected in only a predetermined case.

In one embodiment of the present invention, the predetermined area may be a goal area correlated to the first team. The first control unit, when the player character belonging to the second team keeps the moving object, may control a position of a player character who is a goal keeper of the first team, based on both of either the position of the player character keeping the moving object or the position of the moving object, and a position of the goal area. The second control unit, when the player character belonging to the second team keeps the moving object, may control the position of the player character who is the goal keeper of the first team, based on the position of the goal area.

In another embodiment of the present invention, the predetermined area may be a goal area correlated to the first team. The first control unit, when the player character belonging to the second team keeps the moving object, may control a position of a player character of the first team other than the goal keeper, based on both of either the position of the player character keeping the moving object or the position of the moving object, and a position of the goal area. The second control unit, when the player character belonging to the second team keeps the moving object, may control the position of the player character of the first team other than the goal keeper, based on the position of the player character keeping the moving object or the position of the moving object.

In still another embodiment of the present invention, the predetermined area may be a goal area correlated to the first team. The game device may comprise a unit for, in the case where the player character belonging to the second team shoots the moving object, causing a player character who is a goal keeper of the first team to flick the moving object, and a unit for, in the case where it is determined that the predetermined condition is satisfied, setting a movement direction of the moving object after the moving object is flicked to a direction towards any player character belonging to the second team.

DETAILED DESCRIPTION OF THE INVENTION

In the following, one example of an embodiment of the present invention will be described in detail, based on the accompanying drawings. A game device according to an embodiment of the present invention is realized using, e.g., a consumer game device (an installation-type game device), a portable game device, a portable phone, a personal digital assistant (PDA), a personal computer, a server computer, or the like. Here, a case in which a consumer game device is used to realize a game device according to an embodiment of the present invention will be described.

Figure 1:
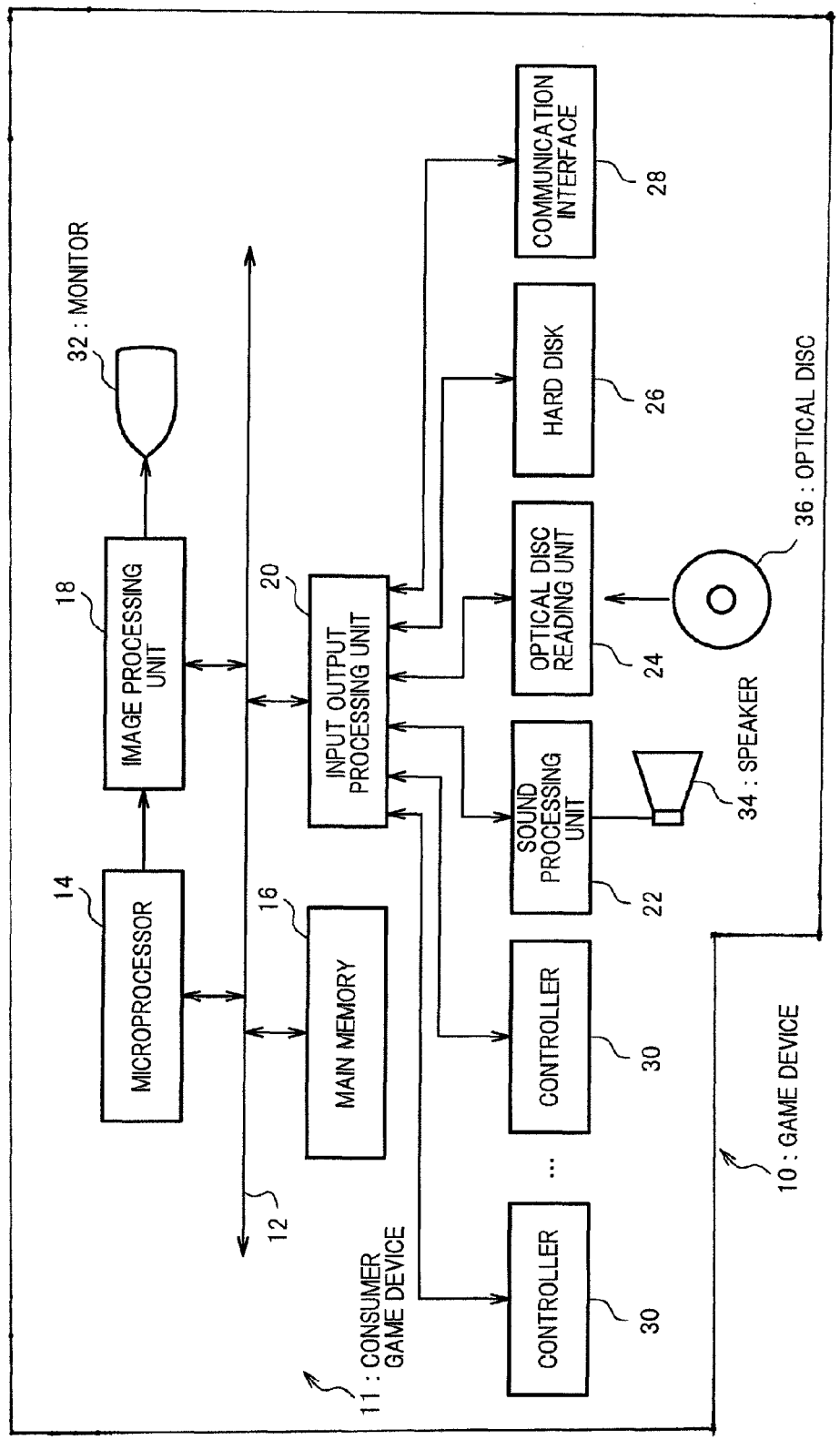
FIG. 1 is a diagram showing a hardware structure of a game device according to an embodiment of the present invention.

FIG. 1 is a diagram showing an entire structure of a game device according to an embodiment of the present invention. A game device 10 shown in FIG. 1 comprises a consumer game device 11, a monitor 32, a speaker 34, and an optical disc 36 (an information storage medium). The monitor 32 and the speaker 34 are connected to the consumer game device 11. As the monitor 32, e.g., a home-use television set receiver is used, and as the speaker 34, e.g., a speaker built in a home-use television set receiver is used.

The consumer game device 11 is a publicly known computer game system. The consumer game device 11 comprises a bus 12, a microprocessor 14, a main memory 16, an image processing unit 18, an input output processing unit 20, a sound processing unit 22, an optical disc reading unit 24, a hard disk 26, a communication interface 28, and a controller 30.

The microprocessor 14 controls the respective units of the consumer game device 11, based on an operating system stored in a ROM (not shown) and a program read from the optical disc 36. The main memory 16 comprises, e.g., a RAM. A program and data stored in the optical disc 36 are written into the main memory 16 upon necessity. The main memory 16 is used also as a working memory of the microprocessor 14. The bus 12 is used to exchange an address and data among the respective units of the consumer game device 11.

The image processing unit 18 includes a VRAM, and renders a game screen image into the VRAM, based on the image data supplied from the microprocessor 14. The game screen image rendered into the VRAM is converted into a video signal, and output to the monitor 32 at a predetermined time.

The input output processing unit 20 is an interface via which the microprocessor 14 accesses the sound processing unit 22, optical disc reading unit 24, hard disk 26, communication interface 28, and controller 30. The sound processing unit 22 includes a sound buffer, and outputs via the speaker 34 various sound data (e.g., game music, game sound effect, a message, and the like) read from the optical disc 36 into the sound buffer. The communication interface 28 is an interface for connecting the consumer game device 11 to a communication network, such as the Internet or the like by wire or radio.

The optical disc reading unit 24 reads a program and data recorded in the optical disc 36. Note that although an optical disc 36 is used here to supply a program and data to the consumer game device 11, other information storage medium, such as a memory card or the like, may be used instead. Alternatively, a program and data may be provided via a communication network, such as the Internet or the like, from a remote place to the consumer game device 11. The hard disk 26 is a typical hard disk device (an auxiliary memory device). Note that a program and data to be described here as being stored in the optical disc 36 may be stored in the hard disk 26 instead.

The controller 30 is a general purpose operation input means for use by a user to input various game operations. A plurality of controllers 30 can be connected by wire or radio to the consumer game device 11. The input output processing unit 20 scans the state of the controller 30 every constant cycle (e.g., every 1/60$^{th}$ of a second), and outputs an operational signal indicating a scanning result to the microprocessor 14 via the bus 12. The microprocessor 14 determines the content of a game operation carried out by a user, based on the operational signal.

In the game device 10, e.g., a soccer game that simulates a soccer match to be played by a first team operated by a first user and a second team operated by a second user is carried out. Similar to an actual soccer match, a match in a soccer game includes a first half and a second half. In the case where the scores of the respective teams are the same at the end of the second half, a winning team is decided by a penalty kick competition. A soccer game is realized by executing out a program read from the optical disc 36.

Figure 2:
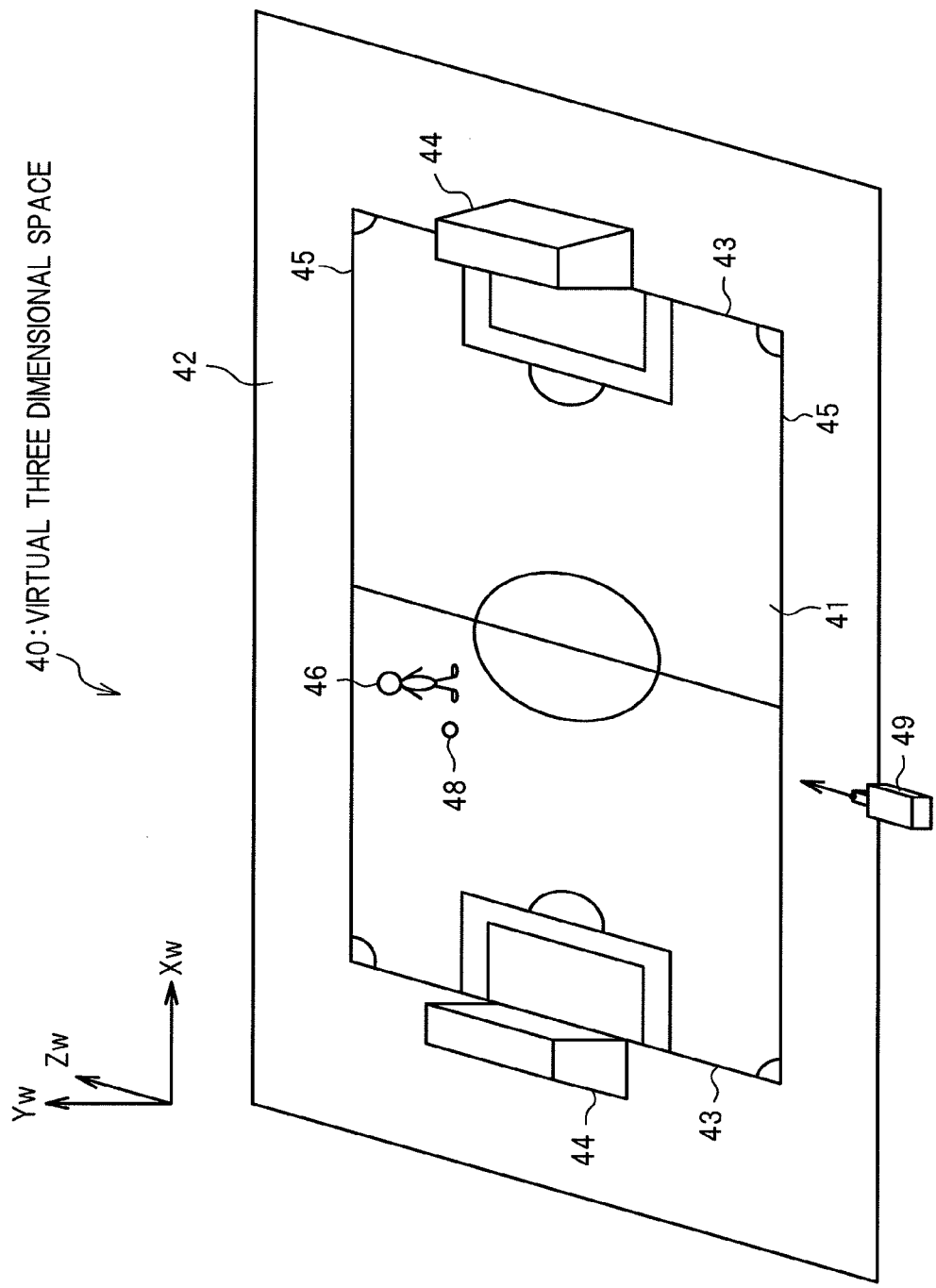
FIG. 2 is a diagram showing one example of a virtual three dimensional space.

In order to display a game screen image of a soccer game, a virtual three dimensional space is created in the main memory 16. FIG. 2 shows one example of a virtual three dimensional space. As shown in FIG. 2, a field 42, or an object representative of a soccer field, is placed in the virtual three dimensional space 40. On the field 42, goal lines 43 and touch lines 45 are shown, and a soccer match is carried out on a pitch 41 enclosed by the goal lines 43 and the touch lines 45.

In the field 42, goals 44, or objects representative of goals, player characters 46, or objects representative of soccer players, a ball 48 (a moving object), or an object representative of a soccer ball, are placed. One of the goals 44 is correlated to the first team, while the other goal 44 is correlated to the second team. With the ball 48 having moved into an area (a predetermined area) inside the goal 44 correlated to either one of the teams, a score event occurs with respect to the other team.

In the field 42, eleven player characters 46 belonging to the first team and eleven player characters 46 belonging to the second team are placed, although they are not shown in FIG. 2.

As a player character 46 and the ball 48 get closer to each other, the ball 48 and the player character 46 are correlated to each other under a predetermined condition, and the ball 48 thereafter moves according to a movement of the player character 46. This is expressed as a dribble motion by the player character 46. In the following, a state in which the ball 48 is correlated to the player character 46 is described as "a player character 46 keeps the ball 48".

When a player character 46 and the ball 48 kept by another player character 46 get closer to each other, the ball 48 and the player character 46 are correlated to each other under a predetermined condition. In this manner, the ball 48 kept by a player character 46 is taken by another player character 46.

Any one of the eleven player characters 46 belonging to the first team is set as an operation target of the first user. In a match, an operation target of the first user will change among the eleven player characters 46 belonging to the first team. For example, a player character 46 who is located closest to the ball 48 among the eleven player characters 46 belonging to the first team is set as an operation target of the first user. Alternatively, for example, the first user's pressing a predetermined button effects change of the operation target of the first user to another player character 46 among those belonging to the first team. Similar to the first team, any one of the eleven player characters 46 belonging to the second team is set as an operation target of the second user.

In the following, a player character 46 who is an operation target of a user among the player characters 46 belonging to a respective team is referred to as an "operation target player character", and player characters 46 other than the operation target player character who belong to the team are each referred to as a "teammate player character".

The operation target player character moves, based on an operation by a user. For example, the operation target player character moves according to a motion instruction operation carried out by a user. In the case where a user carries out, e.g., a pass or shoot instruction operation, the operation target player character accordingly carries out a pass or shoot motion. Meanwhile, the teammate player character is operated by a computer, and moves according to a predetermined algorithm.

In the virtual three dimensional space 40, a virtual camera 49 (a viewpoint) is set. A game screen image showing a picture obtained by viewing the virtual three dimensional space 40 from the virtual camera 49 is displayed on the monitor 32. For example, as the ball 48 is always shown on the game screen, the virtual camera 49 moves within the virtual three dimensional space 40, based on the movement of the ball 48. Alternatively, in order to display the operation target player character all the time on the game screen, the virtual camera 49 may move within the virtual three dimensional space 40, based on the movement of the operation target player character.

Figure 3:
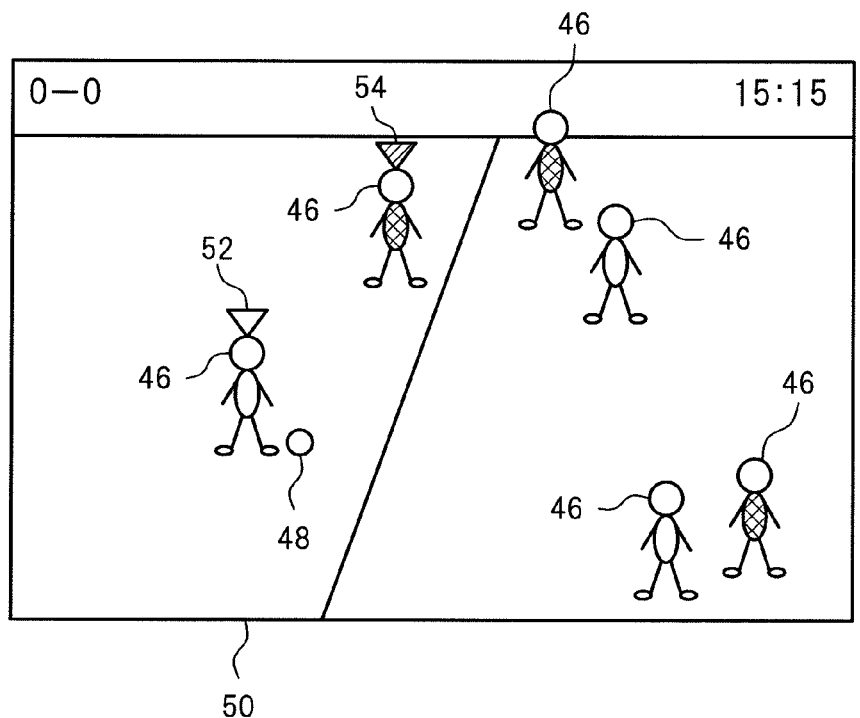
FIG. 3 is a diagram showing one example of a game screen image.

FIG. 3 shows one example of a game screen image. In the game screen image 50 shown in FIG. 3, player characters 46, a first mark image 52, and a second mark image 54 are shown. The first mark image 52 is shown above the head of the operation target character of the first user, and the second mark image 54 is shown above the head of the operation target character of the second user.

Here, as a score scene is the most exciting scene in a soccer game, a game with no score made by either team may lack excitement. For example, in the case where no score is made by either team in a match in a soccer game event, the event itself may not become as exciting as expected. Regarding this point, in a soccer match game according to this embodiment, two modes, namely, a normal mode and a high score mode, are available. A high score mode is a mode arranged to make scoring by the first and second users relatively easy. That is, the high score mode is a mode prepared for the purpose of avoiding a game with no score made by either of the first and second teams. In this embodiment, either mode can be selected before a game starts. Which of the modes is to be selected can be determined through discussion between the first and second users. Alternatively, either user may be given a right to decide, so that the user with the right can select a mode to employ. In the following, difference between the normal mode and the high score mode will be described.

Initially, a first difference will be described. The content of control concerning the position of a teammate player character of one team when a player character 46 of the other team keeps the ball 48 is different between the normal mode and the high score mode.

Figure 4:
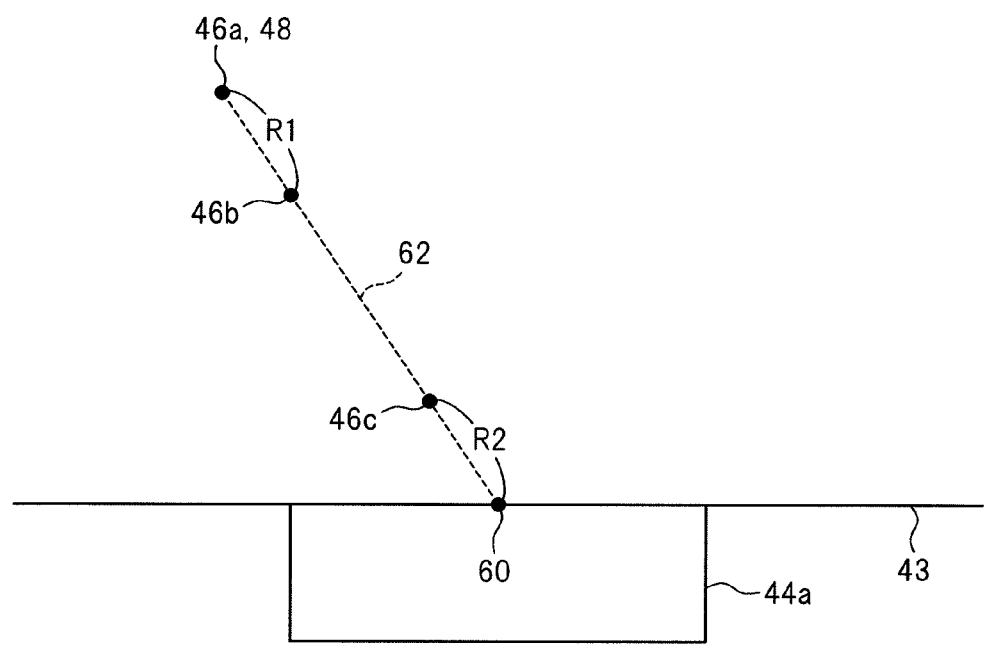
FIG. 4 is a diagram for explaining a normal mode.
Figure 5:
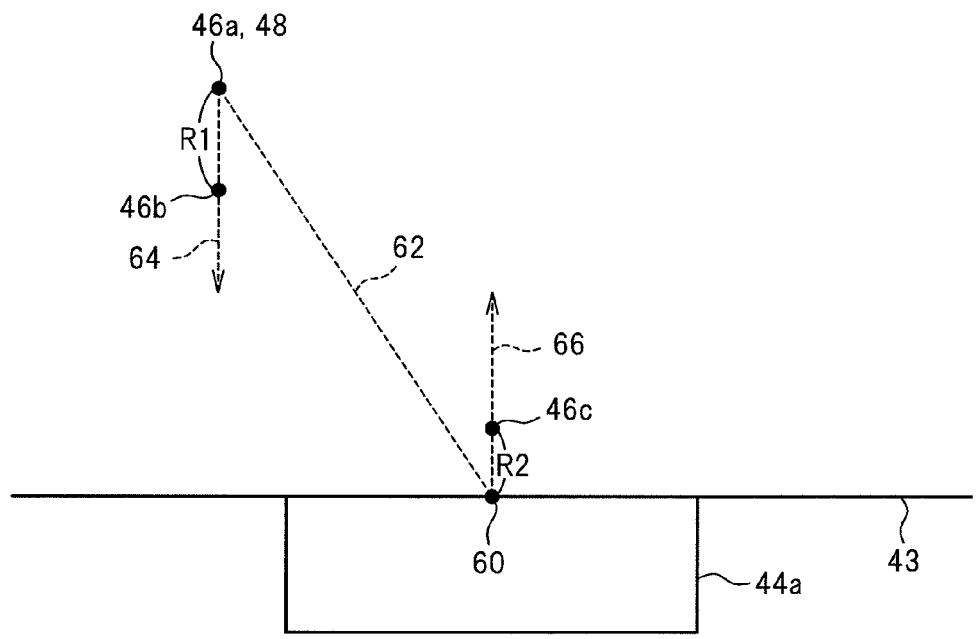
FIG. 5 is a diagram for explaining a high score mode.

FIGS. 4 and 5 are diagrams for explaining the first different point. Assume here a case in which a player character 46 of the second team keeps the ball 48. In FIGS. 4 and 5, reference numeral 44a indicates a goal 44 correlated to the first team; reference numeral 46a indicates a player character 46 who keeps the ball 48 among the player characters 46 belonging to the second team; and reference numeral 46b indicates a player character 46 who marks the player character 46a keeping the ball 48. Obviously, the player character 46b is a player character 46 belonging to the first team. Reference numeral 46c indicates a player character 46 who is the goal keeper of the first team. Note that the player characters 46b, 46c are not operation target player characters, and are thus operated by a computer.

FIG. 4 is a diagram showing control concerning the positions of the player characters 46b, 46c in the normal mode. Initially, control concerning the position of the player character 46b who marks the player character 46a keeping the ball 48 will be described. As shown in FIG. 4, in the normal mode, the player character 46b is controlled so as to be located on the straight line 62 connecting the player character 46a (or the ball 48) and a representative point 60 of the goal 44a of the first team. More specifically, the player character 46b is controlled so as to be located in a position on the above described straight line 62 away from the player character 46a (or the ball 48) by a predetermined distance (R1). Note that in FIG. 4, although the representative point 60 of the goal 44a of the first team is defined at a position on the goal line 43 equidistant from the left and right goal posts, the representative point 60 of the goal 44*a* of the first team may be defined at a different position (this is similarly applied in FIG. 5).

Control concerning the position of the player character 46*c* who is the goal keeper of the first team will be described. As shown in FIG. 4, in the normal mode, the player character 46*c* is also controlled so as to be located on the above described straight line 62. More specifically, the player character 46*c* is controlled so as to be located on the above described straight line 62 away from the representative point 60 of the goal 44*a* of the first team by a predetermined distance (R2).

As described above, in the normal mode, as the player character 46*b* marking the player character 46*a* is controlled so as to be located on the straight line 62 connecting the player character 46*a* (or the ball 48) and the representative point 60 of the goal 44*a* of the first team, in order for the player character 46*a* to approach the goal 44*a* of the first team, the player character 46*a* is required to avoid the opponent player character 46*b* by making effective use of dribbling and the like. Accordingly, the player character 46*a* can hardly move along the straight line toward the goal 44*a*. Further, even if the player character 46*a* successfully avoids the player character 46*b*, while dribbling, and shoots the ball 48, the ball 48 is highly likely to be blocked by the goal keeper player character 46*c*, who is also located on the above described straight line 62. As described above, in the normal mode, the positions of the player characters 46 on the defense side are controlled so as to prevent a score from being readily made.

FIG. 5 is a diagram showing control concerning the position of a teammate player character in the high score mode. Initially, the content of control concerning the position of the player character 46*b* of the first team who marks the player character 46*a* of the second team keeping the ball 48 will be described. As shown in FIG. 5, in the high score mode, the player character 46*b* is controlled so as to be located in the forward direction 64 of the player character 46*a* (in other words, the direction in which the player character 46*a* or the ball 48 moves). More specifically, the player character 46*b* is controlled so as to be located in a position in the forward direction 64 of the player character 46*a* away from the player character 46*a* (or the ball 48) by a predetermined distance (R1). Thus, in the high score mode, the player character 46*b* marking the player character 46*a* is not always located on the straight line 62 connecting the player character 46*a* (or the ball 48) and the representative point 60 of the goal 44*a* of the first team. Alternatively, the player character 46*b* may be controlled so as to be located in a different position from the position shown in FIG. 5, the different position being defined based on the position of the player character 46*a*.

Control concerning the position of the goal keeper player character 46*c* of the first team will be described. As shown in FIG. 5, in the high score mode, the player character 46*c* is controlled so as to be located in a predetermined position based on the goal 44*a* of the first team. More specifically, the player character 46*c* is controlled so as to be located in a predetermined position on a straight line extending from a representative point 60 of the goal 44*a* of the first team in the forward direction 66 by a predetermined distance (R2). Thus, the player character 46*c* is also not always located on the above described straight line 62. Alternatively, the player character 46*c* may be controlled so as to be located in a different position from the position shown in FIG. 5, the different position being defined based on the position of the goal 44*a* of the first team.

As described above, in the high score mode, the player character 46*b* marking the player character 46*a* is not always located on the straight line 62 connecting the player character 46*a* (or the ball 48) and the representative point 60 of the goal 44*a* of the first team. This makes it easier for the player character 46*a* to move toward the goal 44*a* of the first team. In addition, as the goal keeper player character 46*c* is also not always located on the straight line 62, in the case where the player character 46*a* successfully avoids the player character 46*b*, while dribbling, and shoots the ball 48, the ball 48 is less likely to be blocked by the player character 46*c*. As described above, in the high score mode, the positions of the player characters 46 on the defense side are controlled such that a score can be readily made.

In the following, a second difference will be described. In a soccer game, in the case where a player character 46 of one team shoots the ball 48, a player character 46 who is the goal keeper of the other team carries out a motion for catching the ball 48 (a catching motion) or flicking the ball 48 (e.g., a punching motion) The content of control concerning a direction in which the ball 48 will move after the motion for flicking the ball 48 is different between the normal mode and the high score mode.

Figure 6:
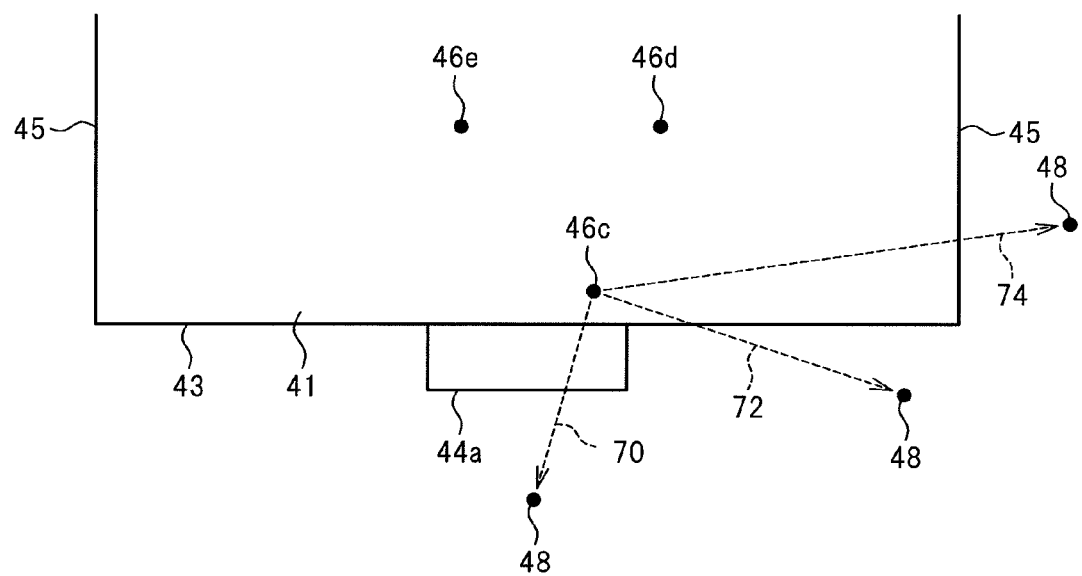
FIG. 6 is a diagram for explaining the normal mode.
Figure 7:
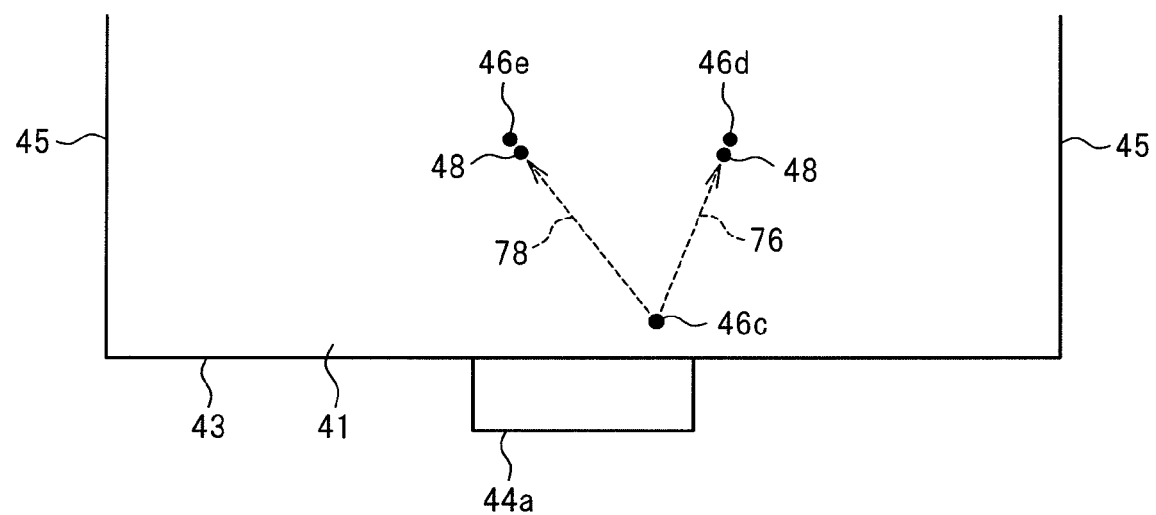
FIG. 7 is a diagram for explaining the high score mode.

FIGS. 6 and 7 are diagrams for explaining the second difference. Here, assume a case in which a player character 46 of the second team shoots the ball 48 and the player character 46 who is the goal keeper of the first team carries out a punching motion. Note that a motion for flicking the ball 48 is not limited to a punching motion, or a motion for flicking the ball 48 with a hand, but includes a motion for flicking the ball 48 using any body part (e.g., head, leg, and so forth) other than a hand. Similar control concerning the movement direction of the ball 48 to that in the case with a punching motion is also carried out in the case in which a motion for flicking the ball 48 is carried out, using any body part other than a hand. Note that in FIGS. 6 and 7, similar to FIGS. 4 and 5, reference numeral 44*a* indicates the goal 44 correlated to the first team; reference numeral 46*c* indicates the player character 46 who is the goal keeper of the first team; and reference numeral 46*d* indicates a player character 46 who shoots the ball 48 among the player characters 46 belonging to the second team; and reference numeral 46*e* indicates a player character 46 other than the player character 46 having shot the ball 48 among the player characters 46 belonging to the second team. The player character 46*c* is not an operation target player character, and thus is operated by a computer.

FIG. 6 shows control concerning the movement direction of the ball 48 to be carried out in the normal mode after a punching motion. As shown in FIG. 6, in the normal mode, the movement direction of the ball 48 after a punching motion by the goal keeper player character 46*c* of the first team is set to a direction (e.g., directions 70, 72, 74 in FIG. 6) with the ball 48 moving beyond the goal line 43 or touch line 45 to outside the pitch 41. Note that the direction 70 in FIG. 6 represents the ball 48 moving over the goal 44*a* to outside the pitch 41. That is, it can be said that the movement direction of the ball 48 in the normal mode after a punching motion by the goal keeper player character 46*c* of the first team is set to a direction without the player characters 46*d*, 46*e* belonging to the second team.

FIG. 7 shows control concerning the movement direction of the ball 48 in the high score mode after a punching motion. As shown in FIG. 7, in the high score mode, the movement direction of the ball 48 after a punching motion by the player character 46*c* who is the goal keeper of the first team is set to a direction (e.g., the directions 76, 78 in FIG. 7) with either of the player characters 46*d*, 46*e* of the second team present.

That is, in the normal mode, the movement direction of the ball 48 after a punching motion by a goal keeper player character 46 is set to a direction with the ball 48 moving beyond the goal line 43 or touch line 45 to outside the pitch 41, and in the high score mode, the movement direction of the ball 48 after a punching motion is set to a direction with a player character 46 of the team of the player character 46 having shoot the ball 48 present. Therefore, a player character 46 of the team of the player character 46 having shot the ball 48 is given a chance to shoot the ball 48 again after the punching motion. That is, in the high score mode, the movement direction of the ball 48 after a punching motion by a goal keeper player character 46 is controlled to be defined so that a score can be made relatively easily.

In a soccer game, a match with no score made by either team may lack excitement. Regarding this point, in a soccer game according to this embodiment, selection of the high score mode makes it possible to make scoring relatively easy, as a result of which a match with no score made by either team can be avoided.

Figure 8:
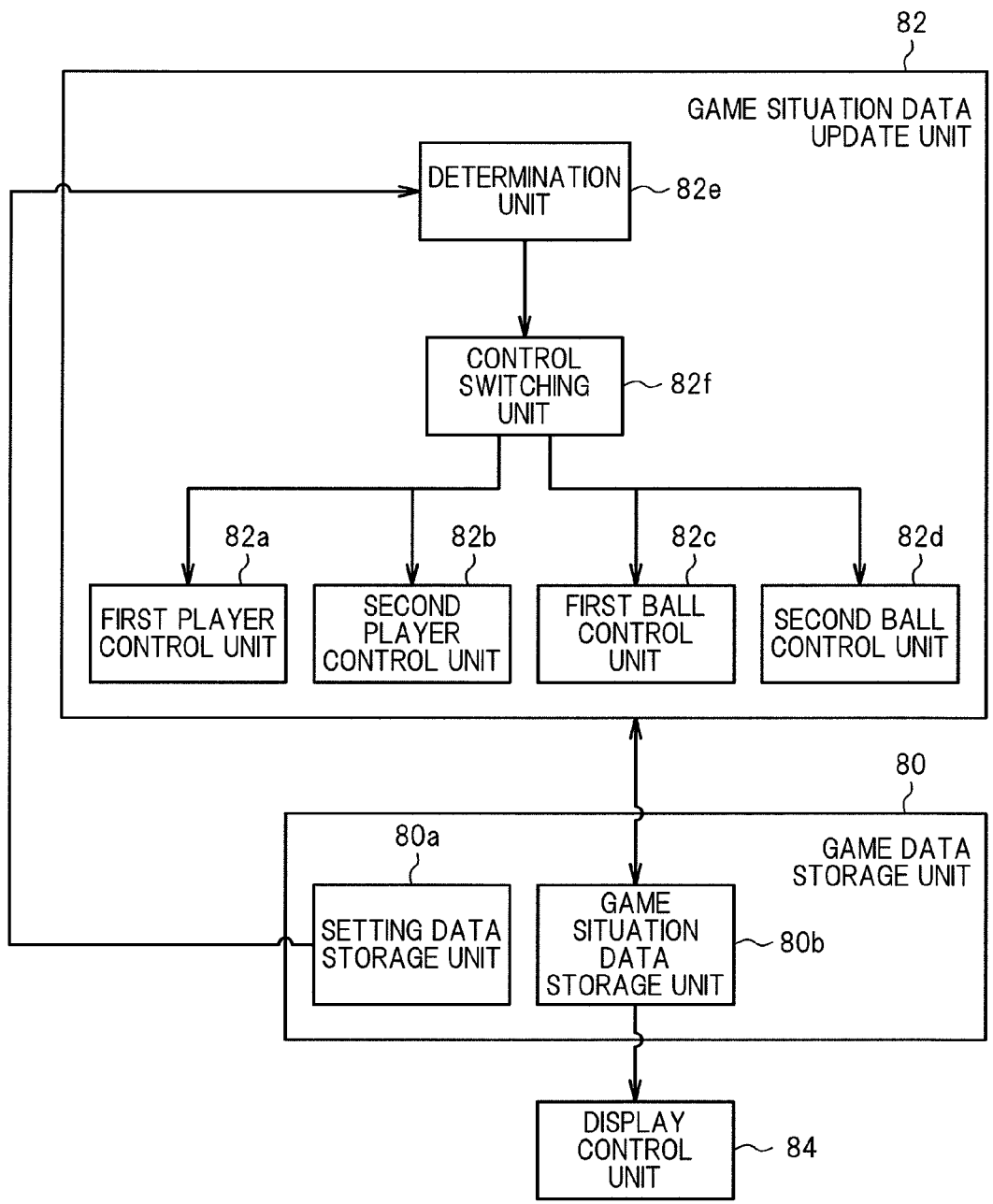
FIG. 8 is a functional block diagram of a game device according to this embodiment.

A structure for realizing the above described normal mode and high score mode will be described. Initially, a function realized in the game device 10 will be described. FIG. 8 is a functional block diagram mainly showing a function related to the present invention among those realized in the game device 10. As shown in FIG. 8, the game device 10 comprises a game data storage unit 80, a game situation data update unit 82, and a display control unit 84. The game data storage unit 80 is realized mainly using, e.g., the main memory 16 and the optical disc 36. The game situation data update unit 82 is realized mainly using, e.g., the microprocessor 14. The display control unit 84 is realized mainly using, e.g., the microprocessor 14 and the image processing unit 18.

The game data storage unit 80 stores game data necessary in execution of a soccer game. For example, model data of the objects placed in the virtual three dimensional space 40 is stored in the game data storage unit 80. Further, e.g., motion data of various motions of the player character 46 is stored in the game data storage unit 80. Still further, e.g., parameters indicating the extent of each of the various abilities of each player character 46 is stored in the game data storage unit 80.

The game data storage unit 80 comprises a setting data storage unit 80a and a game situation data storage unit 80b. The setting data storage unit 80a stores setting data, which is, e.g., data indicating which of the normal mode and high score mode is selected.

The game situation data storage unit 80b stores game situation data indicating the current situation of a game. For example, data indicating the current state (e.g., the position, posture, forward direction, and the like) of each player character 46 is stored in the game situation data storage unit 80b. Further, data indicating the current state (e.g., the position, movement direction, moving speed, and the like) of the ball 48 is stored in the game situation data storage unit 80b. Yet further, data indicating the current state (e.g., the position, viewing direction, and the like) of the virtual camera 49 is stored in the game situation data storage unit 80b.

Besides, data indicating a player character 46 who keeps the ball 48 at the time and data indicating a player character 46 who is an operation target player character at the time are also stored in the game situation data storage unit 80b. Further, data indicating a period of time elapsed after the game starts, scores of both teams, and so forth are also stored in the game situation data storage unit 80b.

The game situation data update unit 82 updates the game situation data. For example, the game situation data update unit 82 updates the state (e.g., the position, posture, and so forth) of an operation target player character, based on an operation carried out by a user, to thereby cause the operation target player character to move according to the operation by the user. Also, for example, the game situation data update unit 82 updates the state of a teammate player character according to a predetermined algorithm, to thereby cause the teammate player character to move according to the predetermined algorithm. For example, in the case where a player character 46 belonging to one team shoots the ball 48, the game situation data update unit 82 changes the position and posture of a player character 46 who is the goal keeper of the other team, based on motion data, to thereby cause the goal keeper player character 46 to catch or flick the ball 48. Further, for example, the game situation data update unit 82 updates the state (e.g., the position, movement direction, and so forth) of the ball 48, based on the motion (dribble motion, pass motion, shoot motion, motion for flicking the ball 48) of the player character 46, to thereby move the ball 48.

In particular, the game situation data update unit 82 includes a first player control unit 82a (first control means) and a second player control unit 82b (second control means) as functional blocks for controlling the position of a teammate player character of one team when a player character of the other team keeps the ball 48.

The first player control unit 82a is adapted to the normal mode. When a player character 46 belonging to one team keeps the ball 48, the first player control unit 82a controls the position of a player character 46 belonging to the other team, based on the position of the player character 46 keeping the ball 48 or the ball 48 and the position of the goal 44 of the other team. For example, as shown in FIG. 4, when a player character 46a of the second team keeps the ball 48, the first player control unit 82a controls the player character 46b who is a defender of the first team and a player character 46c who is the goal keeper of the first team so as to be located on the straight line 62 connecting the position of the player character 46a or the ball 48 and the representative point 60 of the goal 44a of the first team.

Meanwhile, the second player control unit 82b is adapted to the high score mode. When a player character 46 belonging to one team keeps the ball 48, the second player control unit 82b controls the position of a player character 46 belonging to the other team, based on either one of the position of the player character 46 keeping the ball 48 or the ball 48, and the position of the goal 44 of the other team. For example, as shown in FIG. 5, when the player character 46a of the second team keeps the ball 48, the second player control unit 82b controls the player character 46b who is a defender of the first team so as to be located in the forward direction 64 of the player character 46a (in other words, in a direction in which the player character 46a or the ball 48 will move). Also, the second player control unit 82b controls the player character 46c who is the goal keeper of the first team so as to be located in a predetermined position based on the representative point 60 of the goal 44a of the first team.

The game situation data update unit 82 further includes a first ball control unit 82c (first control means) and a second ball control unit 82d (second control means) as functional blocks for controlling a movement direction of the ball 48 after a punching motion by a goal keeper player character 46.

The first ball control unit 82c is adapted to the normal mode. For example, as shown in FIG. 6, in the case where a goal keeper player character 46c carries out a motion for flicking the ball 48, the first ball control unit 82c sets the movement direction of the ball 48 after the goal keeper player character 46c flicks the ball 48 in a direction (e.g., directions 70, 72, 74 in FIG. 6) with the ball 48 moving beyond the goal line 43 or touch line 45 to outside the pitch 41. Alternatively, the first ball control unit 82c may set the movement direction of the ball 48 after the motion for flicking the ball 48, based on the positions of the player characters 46d, 46e of the first team, in a direction without the player characters 46d, 46e of the first team present.

Meanwhile, the second ball control unit 82d is adapted to the high score mode. For example, as shown in FIG. 7, in the case where the goal keeper player character 46c carries out a motion for flicking the ball 48, the second ball control unit 82d sets the movement direction of the ball 48 after the motion for flicking the ball 48, based on the positions of the player character 46d, 46e of the second team, in a direction (e.g., directions 76, 78 in FIG. 7) with the player characters 46d, 46e of the second team present.

The game situation data update unit 82 includes a determination unit 82e and a control switching unit 82f.

The determination unit 82e determines whether or not a predetermined condition is satisfied. In this embodiment, the determination unit 82e determines whether or not the high score mode is selected, based on the setting data.

With the ball 48 kept by one team, the control switching unit 82f causes either one of the first player control unit 82a and the second player control unit 82b to control the position of a player character 46 belonging to the other team. The control switching unit 82f determines which of the first player control unit 82a and the second player control unit 82b is to be caused to carry out the above-described control, based on a result of determination by the determination unit 82e. For example, with determination that the high score mode is not selected, the control switching unit 82f causes the first player control unit 82a to carry out the above-described control. Meanwhile, with determination that the high score mode is selected, the control switching unit 82f causes the second player control unit 82b to carry out the above-described control.

Also, the control switching unit 82f causes either one of the first ball control unit 82c and second ball control unit 82d to control the movement direction of the ball 48 after a goal keeper player character 46 flicks the ball 48. The control switching unit 82f determines which of the first ball control unit 82c and the second ball control unit 82d is to be caused to carry out the above-described control, based on a result of determination by the determination unit 82e. For example, with determination that the high score mode is not selected, the control switching unit 82f causes the first ball control unit 82c to carry out the above-described control. Meanwhile, with determination that the high score mode is selected, the control switching unit 82f causes the second ball control unit 82d to carry out the above-described control.

The display control unit 84 creates a game screen image 50 showing a picture obtained by viewing the virtual three-dimensional space 40 from the virtual camera 49, based on game situation data, and displays the game screen image 50 on the monitor 32.

Figure 9:
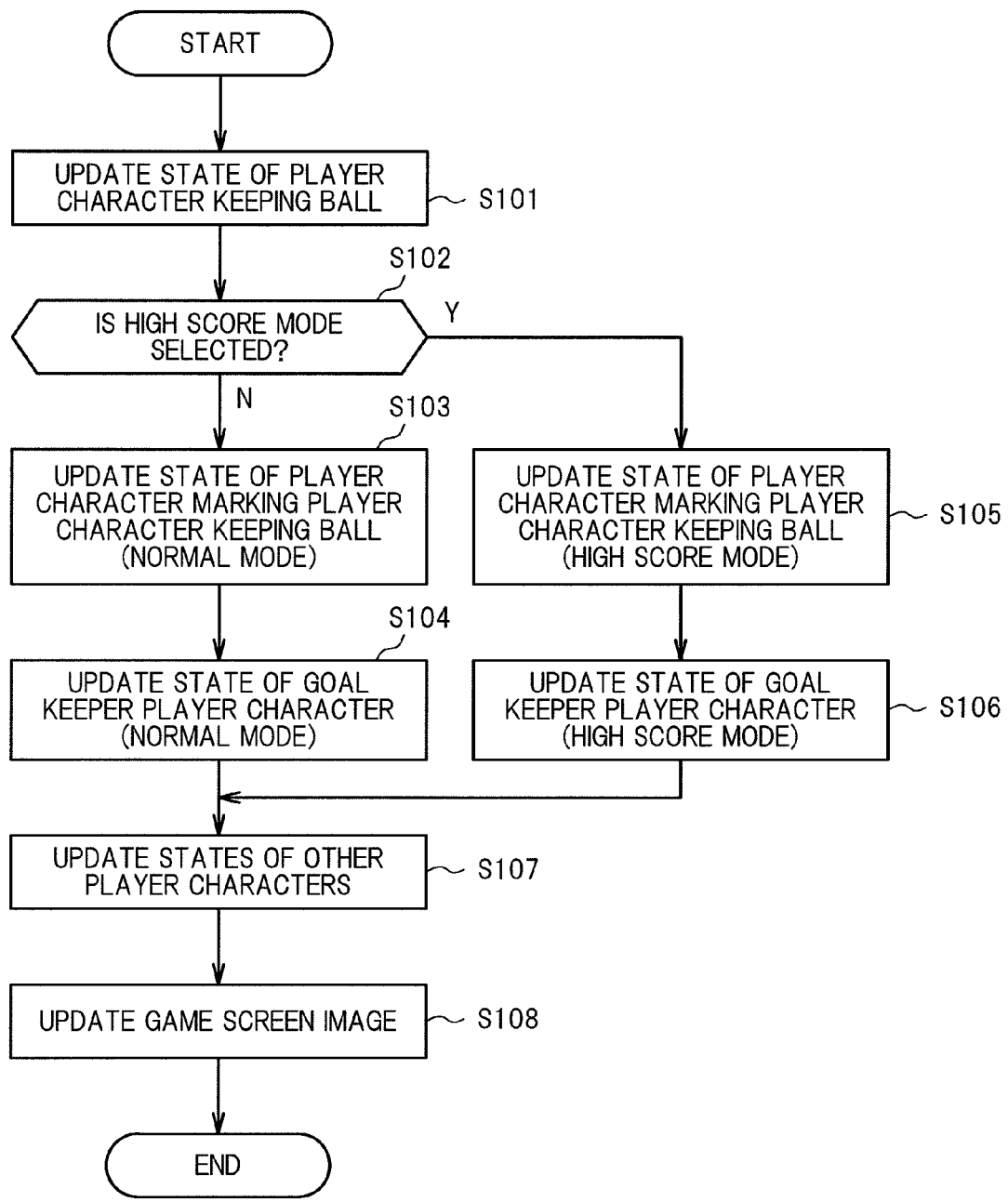
FIG. 9 is a flowchart of a process to be carried out by the game device.
Figure 10:
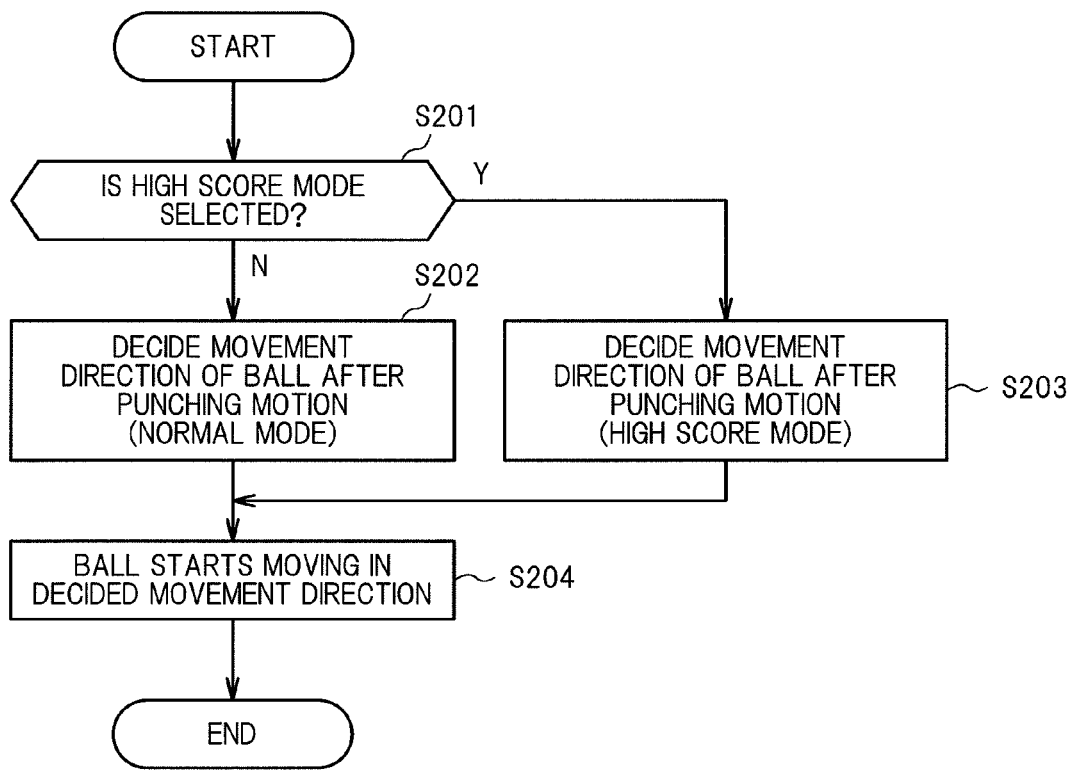
FIG. 10 is a flowchart of a process to be carried out by the game device.

In the following, a process to be carried out in the game device 10 will be described. FIGS. 9 and 10 are flowcharts of an example of a process to be carried out in the game device 10.

FIG. 9 is a flowchart of a process according to the present invention among those to be carried out in the game device 10 every predetermined period of time (e.g., every $\frac{1}{60}^{th}$ of a second) when the ball 48 is kept by one team. The microprocessor 14 carries out a process shown in FIG. 9, following a program read from the optical disc 36. By carrying out the process shown in FIG. 9 by the microprocessor 14, the first player control unit 82a, second player control unit 82b, determination unit 82e, control switching unit 82f, and display control unit 84 are realized.

Here, assuming a case similar to that related to FIGS. 4 and 5, a process shown in FIG. 9 will be described. That is, assume a case in which the player character 46a belonging to the second team keeps the ball 48, and the player character 46b belonging to the first team marks the player character 46a.

In this case, as shown in FIG. 9, the microprocessor 14 (the game situation data update unit 82) updates the state (e.g., the position, posture, and so forth) of the player character 46 keeping the ball 48 (S101). For example, when the player character 46a is an operation target player character of the second user, the state of the player character 46a is updated, based on an operation carried out by the second user. For example, the position, posture, movement direction, and so forth of the player character 46a are updated such that the player character 46a moves according to a motion instruction operation carried out by the second user. Meanwhile, when the player character 46a is not an operation target player character, the state of the player character 46a is updated according to a predetermined algorithm. Note that, in the process at this step, the state (e.g., the position or the like) of the ball 48 is also updated. Specifically, the state of the ball 48 is updated, based on, e.g., change in position of the player character 46a keeping the ball 48.

Thereafter, the microprocessor 14 (the determination unit 82e and control switching unit 82f) determines whether or not the high score mode is selected, with reference to the setting data (S102).

With the high score mode not selected, the microprocessor 14 (the first player control unit 82a and control switching unit 82f) updates the state (e.g., the position, posture, and so forth) of the player character 46b who is marking the player character 46a (S103). For example, the position of the player character 46b is updated as follows. That is, initially, a position on the straight line 62 connecting the player character 46a and the representative point 60 of the goal 44a of the first team and away from the current position of the player character 46a by a predetermined distance (R1) is obtained as a movement destination position of the player character 46b (see FIG. 4). Also, a direction from the current position of the player character 46b to the movement destination position is obtained as the movement direction of the player character 46b. Then, the position of the player character 46b is updated to a position advanced from the current position thereof in the movement direction by a distance based on the moving speed.

Also, the microprocessor 14 (the first player control unit 82a and control switching unit 82f) updates the state (e.g., the position, posture, and so forth) of the player character 46c who is the goal keeper of the first team (S104). For example, the player character 46c is updated as follows. Initially, a position on the straight line 62 connecting the player character 46a and the representative point 60 of the goal 44a of the first team and away from the representative point 60 of the goal 44a of the first team by a predetermined distance (R2) is obtained as a movement destination position of the player character 46c (see FIG. 4). Also, a direction from the current position of the player character 46c to the movement destination position is obtained as a movement direction of the player character 46c. Then, the position of the player character 46c is updated to a position advanced from the current position thereof in the movement direction by a distance based on the moving speed.

Meanwhile, with the high score mode selected, the microprocessor 14 (the second player control unit 82b and control switching unit 82f) updates the state (e.g., the position, posture, and so forth) of the player character 46b who is marking the player character 46a (S105). For example, the position of the player character 46b is updated as follows. That is, initially, a position in the forward direction 64 of the player character 46a and away from the current position of the player character 46a by a predetermined distance (R1) is obtained as a movement destination position of the player character 46b (see FIG. 5). Also, a direction from the current position of the player character 46b to the movement destination position is obtained as the movement direction of the player character 46b. Then, the position of the player character 46b is updated to a position advanced from the current position thereof in the movement direction by a distance based on the moving speed.

Also, the microprocessor 14 (the second player control unit 82b and control switching unit 82f) updates the state (e.g., the position, posture, and so forth) of the player character 46c who is the goal keeper of the first team (S106). For example, the position of the player character 46c is updated as follows. That is, initially, a position on the straight line extending from the representative point 60 of the goal 44a of the first team in the forward direction 66 and away from the position of the representative point 60 by a predetermined distance (R2) is obtained as a movement destination position of the player character 46c (see FIG. 5). Also, the direction from the current position of the player character 46c to the movement destination position is obtained as the movement direction of the player character 46c. Then, the position of the player character 46c is updated to a position advanced from the current position thereof in the movement direction by a distance based on the moving speed.

After the process at S104 or S106, the microprocessor 14 (the game situation data update unit 82) updates the states of the player characters 46 other than the player characters 46a, 46b, 46c (S107). For example, the state of the player character 46 who is an operation target player character is updated, based on an operation carried out by a user. Meanwhile, the state of a player character 46 who is not an operation target player character is updated according to a predetermined algorithm.

Thereafter, the microprocessor 14 (the display control unit 84) updates the game screen image 50 (S108). That is, a game screen image 50 showing a picture obtained by viewing the virtual three dimensional space 40 from the virtual camera 49 is produced in the VRAM. The game screen image 50 produced in the VRAM is displayed on the monitor 32.

FIG. 10 is a flowchart showing a process according to the present invention among those to be carried out in the game device 10 in the case where a goal keeper player character 46 carries out a motion for flicking the ball 48. The microprocessor 14 carries out the process shown in FIG. 10, following a program read from the optical disc 36. By carrying out the process shown in FIG. 10 by the microprocessor 14, the first ball control unit 82c, second ball control unit 82d, determination unit 82e, and control switching unit 82f are realized.

Here, assuming a case similar to that related to FIGS. 6 and 7, the process shown in FIG. 10 will be described. That is, assume a case in which the player character 46d belonging to the second team shoots the ball 68 and the player character 46c who is the goal keeper of the first team carries out a punching motion. Note that a similar process is carried out in the case where a motion for flicking the ball 48, using a body part other than a hand (e.g., head, leg, or the like), is carried out.

In this case, as shown in FIG. 10, the microprocessor 14 (the determination unit 82e and the control switching unit 82f) determines whether or not the high score mode is selected, referring to the setting data (S201).

With the high score mode not selected, the microprocessor 14 (the first ball control unit 82c and control switching unit 82f) determines the movement direction of the ball 48 after the punching motion, as follows (S202). That is, the movement direction of the ball 48 after the punching motion is set to a direction (e.g., directions 70, 72, 74 in FIG. 6) with the ball 48 moving beyond the goal line 43 or touch line 45 to outside the pitch 41 (see FIG. 6).

Meanwhile, with the high score mode selected, the microprocessor 14 (the second ball control unit 82d and control switching unit 82f) determines the movement direction of the ball 48 after the punching motion as follows (S203). That is, initially, any one of the player characters 46 belonging to the second team and located in the vicinity of the goal 44a of the first team is selected. Here, "a player character 46 located in the vicinity of the goal 44a of the first team" refers to, e.g., a player character 46 with the length of a normal drawn from the current position thereof to the goal line 42 on the goal 44a side of the first team equal to or shorter than a predetermined length, or alternatively, e.g., a player character 46 with the distance from the representative point 60 of the goal 44a of the first team to the player character 46 being equal to or shorter than a predetermined distance. In the case where any one of the player characters 46 belonging to the second team and located in the vicinity of the goal 44a of the first team is selected, the movement direction of the ball 48 after the punching motion is set to the direction (e.g., the directions 76, 78 in FIG. 7) from the current position of the ball 48 to the position of the selected player character 46 (see FIG. 7).

After the process at S202 or S203, the microprocessor 14 (the game situation data update unit 82) moves the ball 48 in the movement direction determined at S202 or S203 (S204). That is, the state (e.g., the position, movement direction, and so forth) of the ball 48 is updated such that the ball 48 moves in the movement direction determined at S202 or S203.

As described above, the game device 10 has the normal mode and the high score mode. With the high score mode selected, the position of a player character 46 on the defense side and/or the movement direction of the ball 48 after a goal keeper player character 46 carries out a motion for flicking the ball 48 is/are controlled so that a score can be made relatively easily. With the above, in the game device 10, by selecting the high score mode, it is possible to make scoring relatively easy, as a result of which a game with no score made by either team can be avoided. For example, in a soccer game event or the like, by selecting the high score mode, it is possible to enhance excitement in the event. Also, a user wishing to play a soccer game in a state in which a score can be made relatively easily can enjoy a soccer game in such a state by selecting the high score mode.

In addition, in the game device 10, an arrangement for scoring relatively easily is effected only when the high score mode is selected. If it is always the case that a score can be made easily, excitement of a soccer game may be deteriorated. Regarding this point, according to the game device 10, it is possible to effect an arrangement for making it easy to score only when, e.g., a soccer game event takes place or a user wishes to play a soccer game in a state in which a score can be made easily. For a player, e.g., who does not want to play a soccer game in a state in which a score can be made easily, selection of the normal mode ensures playing a soccer game in a state in which a score cannot be made easily.

Note that the present invention is not limited to the above-described embodiment.

For example, in the high score mode, the ability parameter may be adjusted such that the ability of a goal keeper player character 46 is lowered compared to that in the normal mode, so that scoring becomes relatively easy.

One example of an ability parameter of a goal keeper player character 46 may include, e.g., a parameter (a response parameter) indicating quickness in responding to shooting. The response parameter is used to determine the length of a period of time to elapse, when a player character 46 of a match opponent team shoots the ball 48, before a goal keeper player character 46 starts moving to catch or flick the ball 48. The smaller the value of the response parameter is, the longer this period of time becomes, and accordingly, the lower the possibility of the goal keeper player character 46 catching or flicking the ball 48 becomes. For example, in the high score mode, the value of the response parameter is adjusted such that the speed of response becomes slower compared to that in the normal mode. As a result, the possibility of a goal keeper player character 46 being able to catch or flick the ball 48 becomes lower, which makes it easier to make a score.

For example, either the normal mode or the high score mode may be automatically selected, based on a situation of a soccer game, rather than a user selecting either the normal mode or the high score mode. According to this aspect, e.g., the normal mode is automatically selected when a game starts. Then, when neither team has made any score after elapse of a predetermined period of time after the game (the second half) starts, that is, by the time when only a predetermined period of time or shorter is left before the match (the second half) ends, the normal mode is automatically switched to the high score mode.

According to this aspect, the determination unit 82e determines whether or not a predetermined condition concerning the state of a soccer game is satisfied, based on game situation data. In other words, the determination unit 82e determines whether or not the state (e.g., the period of time elapsed and score situation) of a soccer game becomes a predetermined state, based on game situation data. For example, the determination unit 82e determines whether or not a predetermined period of time has elapsed after a game starts (the second half). In other words, the determination unit 82e determines whether or not the remaining period of time of the match (the second half) is equal to or shorter than a predetermined period of time. Further, the determination unit 82e determines whether nor not neither team has made any score. Then, in the case where it is determined that a predetermined period of time has elapsed after the match (the second half) starts and that neither team has made any score, the determination unit 82e determines that a "predetermined condition" is satisfied. That is, the determination unit 82e determines that the state (e.g., the elapsed period of time and score situation) of the soccer game becomes a predetermined state. With the above, only when the state (e.g., the period of time elapsed and score situation) of a soccer game becomes a predetermined state, can an arrangement for making scoring relatively easy be effected.

Note that, e.g., a game to be carried out in the game device 10 is not limited to a game in which a three dimensional game space comprising three coordinate elements is displayed in a game screen image, and may be a game in which a two dimensional game space comprising two coordinate elements is displayed in a game screen image. That is, a game to be carried out in the game device 10 may be a game in which the positions of a ball and a player character or the like are managed using two coordinate elements.

Further, e.g., a game to be carried out in the game device 10 may be a network game in which a plurality of users participate via a network. Still further, e.g., a game to be carried in the game device 10 may be a sport game other than a soccer game. For example, the present invention is applicable to a game of basket ball, rugby football, or American football, all using a ball (a moving object), and a game of ice hockey using a puck (a moving object).

While there have been described what are at present considered to be certain embodiments of the invention, it will be understood that various modifications may be made thereto, and it is intended that the appended claims cover all such modifications as fall within the true spirit and scope of the invention.

What is claimed is:

1. A game device for carrying out a sport game played between a first team and a second team, in which a score event occurs for the second team in the case where a moving object has moved into a predetermined area, comprising:
   a first control unit which, when a player character belonging to the second team keeps the moving object, controls a position of a player character belonging to the first team, based on both of either a position of the player character keeping the moving object or a position of the moving object, and a position of the predetermined area relative to the player character belonging to the first team;
   a second control unit which, when the player character belonging to the second team keeps the moving object, controls the position of the player character belonging to the first team, based on only one of either the position of the player character keeping the moving object or the position of the moving object, and the position of the predetermined area relative to the player character belonging to the first team; and
   a determination unit which determines whether or not a predetermined condition is satisfied;
   a control switching unit which, in the case where it is determined that the predetermined condition is satisfied, causes the second control unit, instead of the first control unit, to control the position of the player character belonging to the first team when the player character belonging to the second team keeps the moving object.

2. The game device according to claim 1, wherein
   the predetermined area is a goal area correlated to the first team,
   the first control unit, when the player character belonging to the second team keeps the moving object, controls a position of a player character who is a goal keeper of the first team, based on both of either the position of the player character keeping the moving object or the position of the moving object, and a position of the goal area, and
   the second control unit, when the player character belonging to the second team keeps the moving object, controls the position of the player character who is the goal keeper of the first team, based on the position of the goal area.

3. The game device according to claim 1, wherein
   the predetermined area is a goal area correlated to the first team,
   the first control unit, when the player character belonging to the second team keeps the moving object, controls a position of a player character of the first team other than the goal keeper, based on both of either the position of the player character keeping the moving object or the position of the moving object, and a position of the goal area, and
   the second control unit, when the player character belonging to the second team keeps the moving object, controls the position of the player character of the first team other than the goal keeper, based on the position of the player character keeping the moving object or the position of the moving object.

4. The game device according to claim 1, wherein
the predetermined area is a goal area correlated to the first team, and
the game device comprises
- a unit which, in the case where the player character belonging to the second team shoots the moving object, causes a player character who is a goal keeper of the first team to flick the moving object, and
- a unit which, in the case where it is determined that the predetermined condition is satisfied, sets a movement direction of the moving object after the moving object is flicked in a direction towards any player character belonging to the second team.

5. A method for controlling a game device for carrying out a sport game played between a first team and a second team, in which a score event occurs for the second team in the case where a moving object has moved into a predetermined area, comprising:
- a first control step of, when a player character belonging to the second team keeps the moving object, controlling by a processor a position of a player character belonging to the first team, based on both of either a position of the player character keeping the moving object or a position of the moving object, and a position of the predetermined area, relative to the player character belonging to the first team;
- a second control step of, when the player character belonging to the second team keeps the moving object, controlling by the processor the position of the player character belonging to the first team, based on only one of either the position of the player character keeping the moving object or the position of the moving object, and the position of the predetermined area, relative to the player character belonging to the first team; and
- a determination step of determining at the processor whether or not a predetermined condition is satisfied;
- a control switching step of, in the case where it is determined that the predetermined condition is satisfied, controlling by the processor at the second control step, instead of the first control step, the position of the player character belonging to the first team when the player character belonging to the second team keeps the moving object.

6. A non-transitory computer readable information storage medium storing a program for causing a computer to function as a game device for carrying out a sport game played between a first team and a second team, in which a score event occurs for the second team in the case where a moving object has moved into a predetermined area, the game device comprising:
- a first control unit programmed to, when a player character belonging to the second team keeps the moving object, control a position of a player character belonging to the first team, based on both of either a position of the player character keeping the moving object or a position of the moving object, and a position of the predetermined area, relative to the player character belonging to the first team;
- a second control unit programmed to, when the player character belonging to the second team keeps the moving object, control the position of the player character belonging to the first team, based on only one of either the position of the player character keeping the moving object or the position of the moving object, and the position of the predetermined area, relative to the player character belonging to the first team; and
- a determination unit programmed to determine whether or not a predetermined condition is satisfied; and
- a control switching unit programmed to, in the case where it is determined that the predetermined condition is satisfied, cause the second control unit, instead of the first control unit, to control the position of the player character belonging to the first team when the player character belonging to the second team keeps the moving object.

* * * * *